Patented Aug. 17, 1954

2,686,806

UNITED STATES PATENT OFFICE 2,686,806

1(3)-ALKOXYPHENYL-3(1)-ALKYLPHENYL-2-THIOUREAS

Charles F. Huebner, Morristown, and Caesar R. Scholz, Summit, N. J., assignors to Ciba Pharmaceutical Products, Incorporated, Summit, N. J., a corporation of New Jersey No Drawing. Application January 31, 1952, Serial No. 269,336

6 Claims. (Cl. 260—552)

The present invention relates to diphenyl thioureas wherein one phenyl group is substituted in the para-position with an alkoxy group and the other phenyl group is substituted in the para-position with an alkyl group.

Despite intensive research for a long time by scientists for chemotherapeutic agents effective against tuberculosis, the results achieved leave much to be desired. A primary object of the present invention is the embodiment of a group of new substances characterized by anti-tuberculosis activity in high degree with a concomitant low toxicity. The substances are adapted to be administered orally.

This object and others which will appear hereinafter are realized by the di-(para-substituted phenyl)-thioureas of the present invention, which thioureas correspond to the formula:

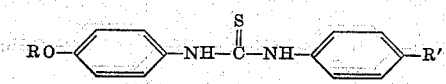

wherein R is an alkyl radical containing from 2 to 5 carbon atoms inclusive in either straight or branched chain configuration, and R' is an aliphatic hydrocarbon radical containing from 3 to 6 carbon atoms inclusive in either straight chain or branched chain configuration. R' may be modified further in that any one carbon atom of the chain other than the first or last may be replaced by oxygen.

The new compounds, as precedingly defined, are obtained by reacting an appropriately para-substituted aniline with an appropriately substituted phenyl isothiocyanate in the presence or absence of a solvent such as alcohol, benzene, toluene, propanol and the like. The reaction is carried out as desired either at room temperature or at elevated temperature, although as a general rule application of external heat is unnecessary. The product crystallizes out of the reaction mixture on cooling. The process is illustrated by the reaction:

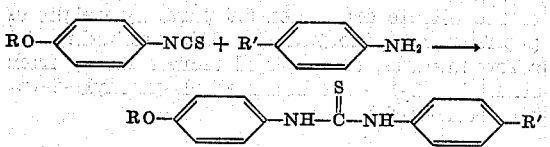

It is immaterial which of the reactants entering into the reaction carries the alkoxy radical or the hydrocarbon group. Thus a para-alkyl-phenyl isothiocyanate may be reacted with a para-alkoxy-aniline according to the process:

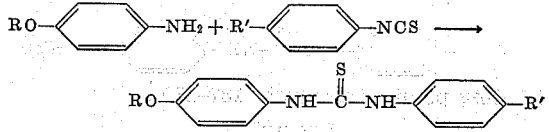

Alternatively, thiophosgene may be reacted with a para-alkyl aniline and the resulting reaction product then reacted with a para-alkoxy aniline; or the thiophosgene may first be reacted with the para-alkoxy aniline and the resulting reaction product then reacted with the para-alkyl aniline.

The substituted isothiocyanates are prepared by the method of Dyson [Journal of the Chemical Society (London), 436 (1927)] by the action of the thiophosgene on the desired substituted aniline. The older method of reacting the substituted aniline in ammonia with carbon disulfide, preparing the lead salt of the resultant thiocarbamate and decomposing to the isothiocyanate may be used also.

The new compounds are useful as therapeutics and as intermediates for the preparation of therapeutically active substances. They comprise compounds with antituberculosis activity which, in comparison with known antituberculosis agents such as the thiosemicarbazones, are considerably less toxic and of enhanced activity.

The invention is described in greater detail in the examples which follow and which are presented solely by way of illustration and not by way of limitation. In the examples, parts by weight bear the same relation to parts by volume as do grams to milliliters. Temperatures are expressed in degrees centigrade. Melting points are uncorrected.

Example 1

To 2 parts by weight of p-propyl aniline dissolved in 20 parts by volume of ethanol are added at room temperature 2.84 parts by weight of p-propoxyphenyl isothiocyanate. After an hour, the crystalline product, 1-(p-propylphenyl)-3-(p-propoxyphenyl)-2-thiourea

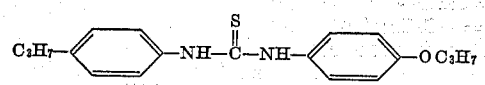

is filtered off and recrystallized from ethanol; it melts at 149–150°.

By similarly reacting a para-R'-substituted aniline with an equimolar quantity of the corresponding isothiocyanate indicated below according to the reaction scheme

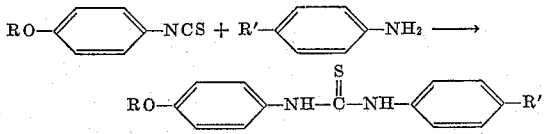

the substituted thioureas shown in the following Examples 1a to 1m are obtained.

Example 1a

R=(iso) C₅H₁₁—
R'=—C₃H₇
Thiourea product:

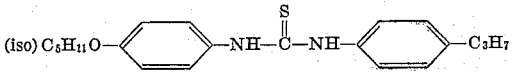

Melting point of product: 130–132°.

Example 1b

R=C₂H₅—
R'=—C₃H₇(iso)
Thiourea product:

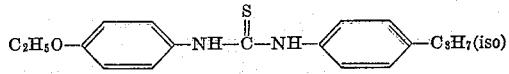

Melting point of product: 137–139°.

Example 1c

R=(iso) C₅H₁₁—
R'=—C₃H₇(iso)
Thiourea product:

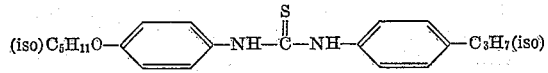

Melting point of product: 133–134°.

Example 1d

R=C₂H₅—
R'=—C₄H₉
Thiourea product:

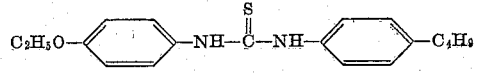

Melting point of product: 148–149°.

Example 1e

R=C₂H₅—
R'=—C₄H₉(tert)
Thiourea product:

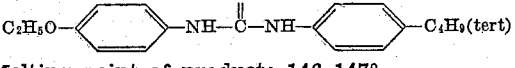

Melting point of product: 146–147°.

Example 1f

R=C₂H₅—
R'=—C₅H₁₁
Thiourea product:

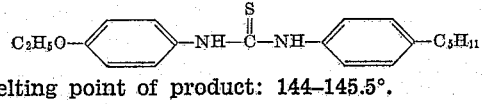

Melting point of product: 144–145.5°.

Example 1g

R=C₂H₅—
R'=—C₅H₁₁(iso)
Thiourea product:

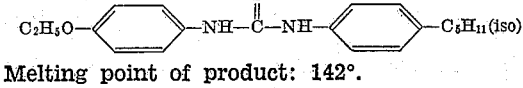

Melting point of product: 142°.

Example 1h

R=C₃H₇—
R'=—C₅H₁₁(iso)
Thiourea product:

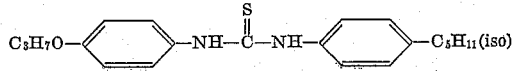

Melting point of product: 132–133°.

Example 1i

R=(iso) C₅H₁₁—
R'=—C₅H₁₁(iso)
Thiourea product:

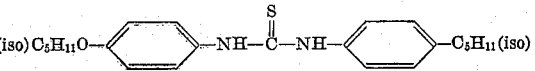

Melting point of product: 141–142°.

Example 1j

R=C₂H₅—
R'=—C₆H₁₃
Thiourea product:

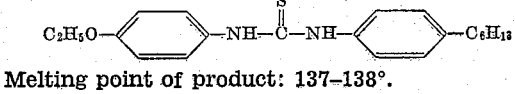

Melting point of product: 137–138°.

Example 1k

R=C₃H₇—
R'=—C₆H₁₃
Thiourea product:

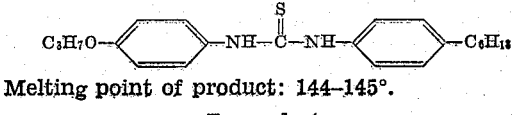

Melting point of product: 144–145°.

Example 1m

R=C₄H₉—
R'=—C₆H₁₃
Thiourea product:

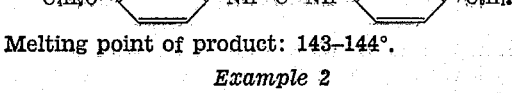

Melting point of product: 143–144°.

Example 2

8.1 parts by weight of p-butylphenyl isothiocyanate are dissolved in 75 parts by volume of ethanol and 7 parts by weight of p-butoxy aniline added. The reaction mixture is allowed to stand for 1 hour at room temperature after which the solid crystalline product, 1(p-butoxyphenyl)-3-(p-butylphenyl)-2-thiourea:

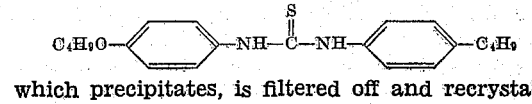

which precipitates, is filtered off and recrystallized from ethanol; it melts at 151–152°.

Example 3

5.65 parts by weight of p-nitro-ethoxymethyl-benzene are dissolved in 25 parts by volume of ethanol and hydrogenated over Raney nickel at 50 lbs. pressure. The catalyst is filtered off and to the filtrate are added 5.6 parts by weight of p-phenetyl-isothiocyanate. After refluxing for a few minutes, cooling and recrystallizing from ethanol, 1-[p-(2-ethoxymethyl)-phenyl]-3-(p-phenetyl)-2-thiourea:

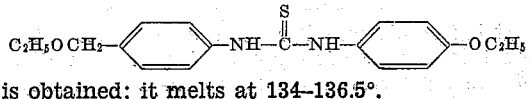

is obtained; it melts at 134–136.5°.

By substituting the appropriate amine and isothiocyanate and carrying out the reaction:

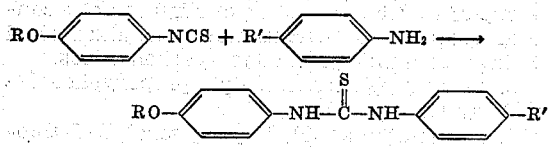

under the conditions illustrated above, the various thioureas set forth in the following Examples 4 to 9 inclusive are obtained.

*Example 4*

R=C₂H₅—
R'=—C₂H₄OCH₃
Thiourea product:

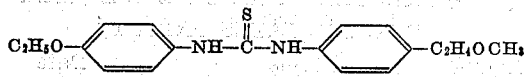

Melting point of product: 131–133°.

*Example 5*

R=C₃H₇—
R'=—C₂H₄OCH₃
Thiourea product:

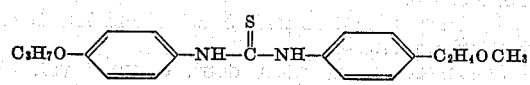

Melting point of product: 136–137°

*Example 6*

R=C₄H₉—
R'=—C₂H₄OCH₃
Thiourea product:

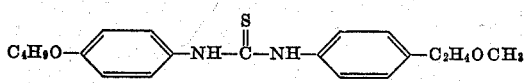

Melting point of product: 134–135°.

*Example 7*

R=(iso) C₄H₉—
R'=—C₂H₄OCH₃
Thiourea product:

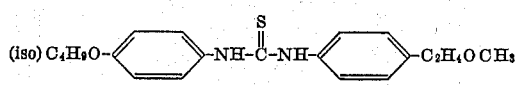

Melting point of product: 124–125°.

*Example 8*

R=C₂H₅—
R'=—C₃H₆OCH₃
Thiourea product:

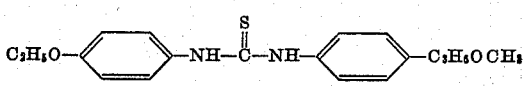

Melting point of product: 125–126°.

*Example 9*

R=(iso) C₄H₉—
R'=—C₃H₆OCH₃
Thiourea product:

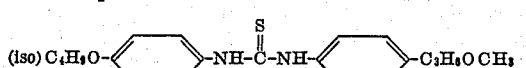

Melting point of product: 122–123°.

p-Methoxyethyl-aniline is prepared as follows: 45 parts by weight of methyl-2-phenyl ethyl ether are added dropwise to 120 parts by volume of well-stirred mixed acid [equal parts by volume of sulfuric (sp. gr. 1.84) and nitric (sp. gr. 1.42) acids] while the temperature is maintained at −30° with external cooling. After reaction the mixture is allowed to warm up to −10° and poured into an excess of chopped ice. The partly crystalline mixture of nitration isomers is filtered at 0°, the oily ortho-isomer being separated from the crystalline p-nitro - (2 - methoxyethyl)-benzene. The latter is crystallized from ether; it melts at 60–61°. 10 parts by weight of this nitro compound are hydrogenated at 50 lbs. pressure over Raney nickel-50 parts by volume of ethanol, to produce p-(2-methoxyethyl)-aniline which, after filtration to remove the catalyst, is ready for use with the appropriate isothiocyanate.

p-(3-methoxypropyl)-aniline is prepared as follows: 50 parts by weight of 3-phenylpropyl bromide are refluxed with 167 parts by volume of 1.5-normal sodium methoxide in methanol overnight. The mixture is cooled and the sodium bromide filtered off. The solvent is distilled off and the reaction product, 3-methoxy-propyl-benzene, distilled at 205–210°. The latter is nitrated and reduced as described above to p-(3-methoxypropyl)-aniline.

The substituted-phenyl isothiocyanates are prepared as follows: To a vigorously stirred suspension of 20 parts by volume of thiophosgene in 200 parts by volume of water are added dropwise with cooling to keep the temperature at 15°, 30 parts by weight of p-propoxy-aniline in 100 parts by volume of chloroform. After 30 minutes the chloroform layer is separated and the p-propoxyphenyl isothiocyanate distilled at 163–168° under 15 mm. pressure. By proceeding as thus described the following isothiocyanates can also be prepared from the appropriate corresponding starting materials:

p-iso-amyloxyphenyl isothiocyanate, B. P.₁₇ mm. 188–190°; p-butylphenyl isothiocyanate, B. P.₁₇ mm. 165–168°; p-butoxyphenyl isothiocyanate, B. P.₁₈ mm. 179–181°; p-iso-butoxyphenyl isothiocyanate, B. P.₁₈ mm. 172–176°.

The new compounds have been found to be useful, for example, in the treatment of mice infected with a human strain of tubercle bacillus, such for example as *Mycobacterium tuberculosis*, strain H 37 RV. In the treatment of thus-infected mice, where the degree of infection is such that 50% of the animals are dead by the twentieth day after infection, the mice are treated with the new compound according to this invention incorporated in the diet for 30 days followed by the diet without the said compound. A compound is considered to show good antitubercular activity if 50% or more of the animals are alive on the 35th day after infection. Those compounds showing good activity may be utilized according to the same method except that they are fed for 20 days after infection at dose levels ranging from 0.1% down to 0.005% concentration in the diet. Some of the compounds of the invention may be fed at concentrations of 3% without causing noticeable ill effects.

When tested according to this method Streptomycin gives a survival time in excess of 15 days at a dose level of ½ mg. per 20-gram mouse administered subcutaneously daily for 20 days. Para-aminosalicyclic acid under the conditions of this test gives a survival time in excess of 15 days at a dose level of 0.5% concentration in the diet. At a concentration of 0.25% the survival results are variable.

When used according to this method, antituberculosis activities of representative compounds of the invention are as follows:

*Anti-tuberculosis activity*

| Compound Y—⌬—NH—C(S)—NH—⌬—R' | | Concentration of drug in feed, percent by weight | Percent animals surviving on 35th day after infection |
|---|---|---|---|
| Y | R' | | |
| $C_2H_5O-$ | $-C_3H_7$ iso | 0.5 | 90 |
| $C_2H_5O-$ | $-C_4H_9$ | 0.05 / 0.1 | 80 / 100 |
| $C_4H_9O-$ | $-C_4H_9$ | 0.5 | 100 |
| $C_2H_5O-$ | $-C_4H_9$(tert) | 0.5 | 100 |
| $C_2H_5O-$ | $-C_5H_{11}$ iso | .05 / .025 | 90 / 60 |
| $C_2H_5O-$ | $-C_6H_{13}$ | 0.2 | 100 |
| $C_2H_5O-$ | $-CH_2OC_2H_5$ | 0.3 | 100 |
| $C_2H_5O-$ | $-CH_2CH_2OCH_3$ | 0.5 | 100 |
| $C_4H_9O-$ | $-H$ | 0.5 | 10 |
| $C_7H_{15}O-$ | $-OC_7H_{15}$ | 0.15 | 0 |
| $C_6H_{13}-$ | $-C_6H_{13}$ | 0.5 | 50 |
| $CH_3-$ | $-CH_3$ | 0.5 | 0 |

The relative inactivity of the last four compounds illustrates the specificity in the activity of the compounds according to the invention.

Having thus disclosed the invention, what is claimed is:

1. A di-(p-substituted-phenyl)-thiourea of the formula

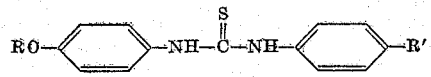

wherein R is an alkyl radical containing from two to five atoms, and R' is selected from the group of radicals consisting of alkyl radicals containing from 3 to 6 carbon atoms and alkoxyalkyl radicals containing from 3 to 4 carbon atoms.

2. 1-(p-propylphenyl)-3-(p - propoxyphenyl)-2-thiourea.

3. 1-(p-butylphenyl)-3-(p - phenetyl)-2-thiourea.

4. 1-(p - isoamylphenyl)-3 - (p - phenetyl)-2-thiourea.

5. 1-[p-(2 - ethoxymethyl)-phenyl]-3-(p-phenetyl)-2-thiourea.

6. 1-(p-methoxyethylphenyl)-3-(p - p - propoxyphenyl)-2-thiourea.

References Cited in the file of this patent

UNITED STATES PATENTS

| Number | Name | Date |
|---|---|---|
| 2,263,730 | Hentrich | Nov. 25, 1941 |

OTHER REFERENCES

Dienske, "Rec. Trav. Chim.," vol. 50 (1931), pp. 407–14.

Lange et al., "J. Am. Chem. Soc.," vol. 48 (1926), pp. 1069–74.

Dyson et al., "J. Chem. Soc." (London), 1924, vol. 125, pp. 1702–8.

Jacobson et al., "Ber. deut. Chem.," vol. 36 (1903), p. 3851.

Braun et al., "Ber. deut. Chem.," vol. 45 (1912), pp. 2196–7.